United States Patent Office 2,726,872
Patented Dec. 13, 1955

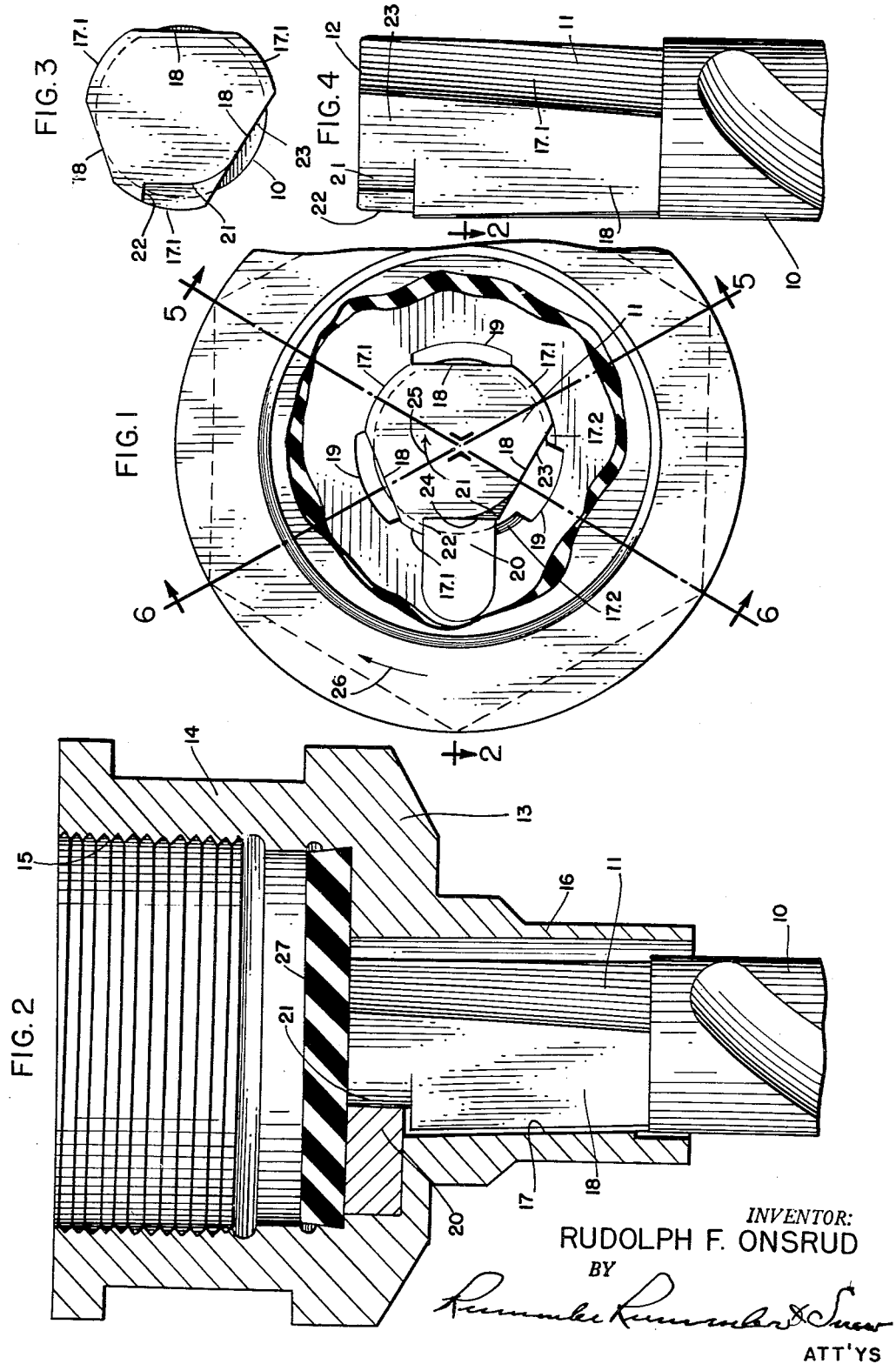

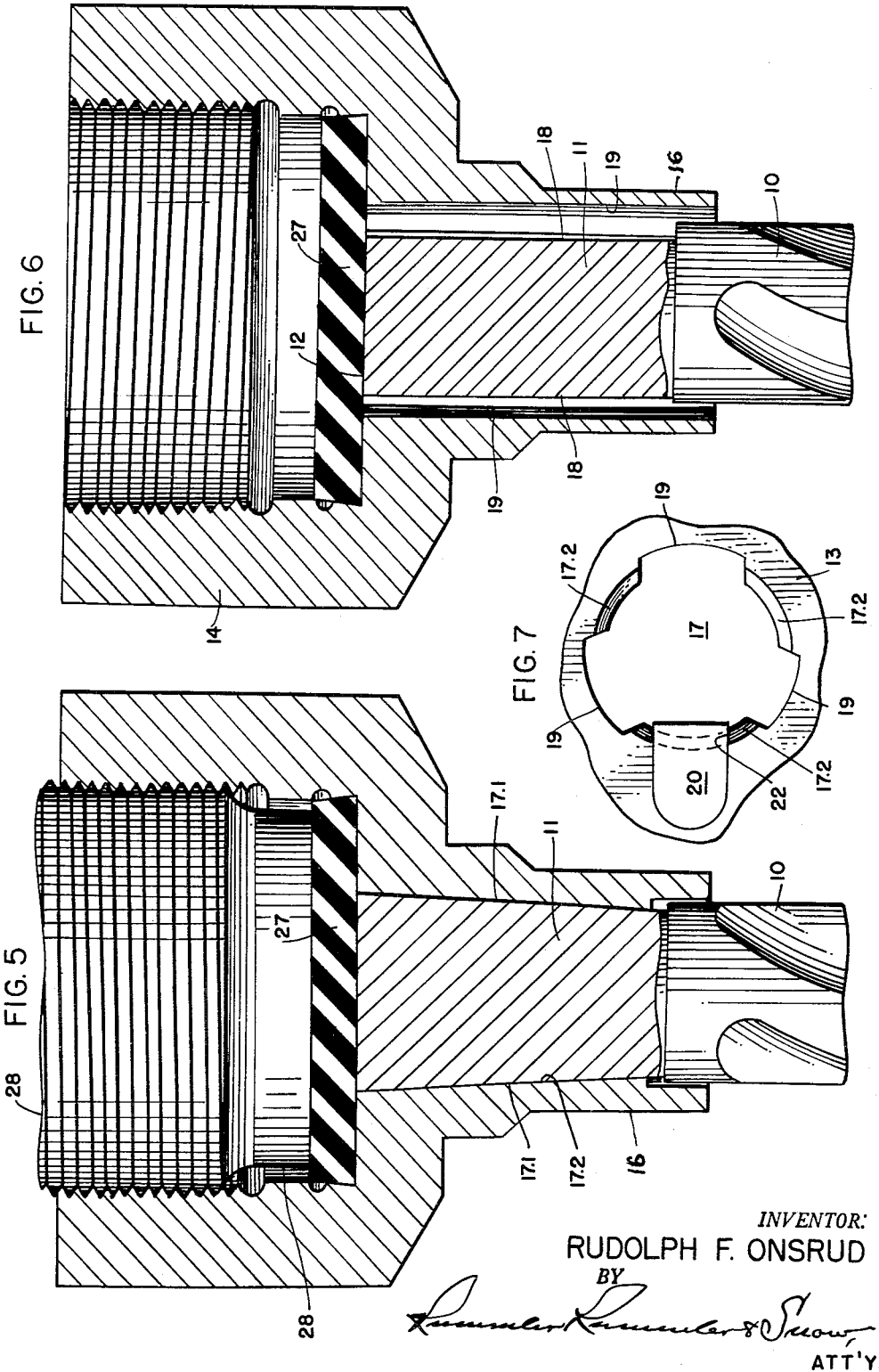

2,726,872

ROTARY TOOL SHANK AND CHUCK

Rudolph F. Onsrud, Chicago, Ill., assignor to Onsrud Cutter Manufacturing Company, Libertyville, Ill., a corporation of Illinois Application April 23, 1953, Serial No. 350,599

8 Claims. (Cl. 279—103)

This invention relates to interfitting tool shanks and chucks for rotary cutting tools, such as drills and routing tools.

The present invention is an improvement upon and carrying forward of the invention represented by my Patent No. 2,280,299 of April 21, 1942, and the patent of Willem Groen No. 2,634,985 dated April 14, 1953 in which shank of the cutting tool is tapered conically with its peripheral surface converging toward the cutting tool, whereby the tool shank is clamped in wedging engagement with the chuck so as to be effectively secured against vibration when in use.

The main objects of the present invention are to provide an improved form of tool shank and chuck whereof the butt end of the shank is larger in diameter at the inner end of the chuck socket and converges conically to a smaller diameter at the outer end of the chuck socket but of such form that the tool may be inserted or removed from the chuck without removing the chuck from the machine spindle; to provide an improved structure of this kind in which the conical surface of the shank and chuck are mutually fluted in such manner that the tool may be readily freed for removal from the chuck by mere loosening of the chuck on its spindle and a slight backward rotation of the tool; to provide an improved device of this kind wherein the chuck has positive driving means for the tool in addition to its wedging relation thereto; and to provide a device of this kind having an inverted taper chuck that grips the bit shank throughout its entire length and holds the bit in perfect axial alinement, eliminates any possibility of bit vibration, chatter or deflection, and provides positive driving engagement between the chuck and shank.

A specific embodiment of this invention is shown in the accompanying drawings in which:

Figure 1 is a top plan view, partly broken away, of the improved chuck and tool shank in driving relation to each other.

Fig. 2 is a section taken on the line 2—2 of Fig. 1.

Fig. 3 is a plan view of the butt end of the cutter shank.

Fig. 4 is a side elevation of the cutter shank with the cutter partly broken away, as viewed from the bottom of Fig. 1.

Fig. 5 is a section taken on the planes represented by the lines 5—5 meeting at the axis of the cutter in Fig. 1, but showing the driving spindle in place in the chuck.

Fig. 6 is a vertical section taken on the intersecting planes represented by the lines 6—6, and the axis of the cutter as indicated in Fig. 1.

Fig. 7 is a fragmentary top plan view of the chuck as shown in Fig. 1, but with the tool shank removed.

In the form shown in the drawings, the cutter 10 has a shank 11 of generally conical form, with its larger diameter at the butt end 12. The chuck 13 has a nut portion 14 that is internally threaded at 15 to fit the spindle on which it is to be mounted, and has a tubular sleeve portion 16 that has an axial socket 17 for receiving the shank 11 of the cutting tool 10. The socket has conical inner walls conforming to the conical surface of the tool shank 11 in complementary fashion with the longitudinal elements of the conical contour converging toward lower or the outer end of the socket 17. The surface of the tool shank 11 and the socket wall 17 are fluted or relieved longitudinally so as to provide angularly spaced lands or high surface portions on each that conform to the common conical contour of the tool shank and socket. The lands of the tool shank are indicated by numerals 17.1 and those on the socket walls are indicated by numerals 17.2.

The longitudinal flutes or depressed areas on the drill shank are indicated by numeral 18, and those in the socket wall are indicated by the numeral 19. These relieved or depressed areas extend longitudinally throughout the length of the tool socket of the chuck and are of such width and depth as to provide clearance in each of them for the respective lands of the other when the tool is turned back from its driving position through a certain angular interval which will bring the lands of each into registry with respective depressions of the other. In the specific form shown in the drawings the depressions 18 are flat planar surfaces parallel with the axis of rotation of the tool.

These two angular positions of the tool shank in the socket are determined by stops. A stop lug 20 is incorporated in the chuck so as to project into a groove 21 formed in one side at the upper or butt end of the tool shank, to receive the lug. The groove walls of groove 21 are shaped to permit such angular movement, to provide a shoulder 22 that engages the stop lug 20 when the tool shank is in its driving position and to provide a surface 23 that serves as a shoulder that abuts against the inner face 24 of the lug 22 and limits the rotation of the tool clockwise relative to the chuck as indicated by the arrow 25 in Fig. 1, assuming that the normal rotation of the driving rotation of the chuck is clockwise as indicated by the arrow 26 in said Fig. 1. When the surface 23 abuts the surface 24, the lands 17 of the tool shank will register with the grooves 19 of the chuck and the corresponding lands of the chuck will register with respective depressed areas 18 of the tool shank respectively. This relative position of the tool shank and chuck socket surfaces provides clearance for their respective lands so that the tool may be withdrawn from the socket by pulling it downward.

The lands 17.1 are preferably of different angular widths respectively and the lands 18 of the socket are similarly proportioned so that there will be only one position in which the tool shank may be inserted into the chuck socket and so that the lug 20 will register with the groove 21.

As shown in Figs. 2, 5 and 6, the socket 17 opens into the threaded nut portion of the chuck, and a resilient rubber cushion 27 is provided in the nut portion, at its lower end, for engagement by the end of the spindle 28, shown fragmentarily in Fig. 5, so that when the chuck is screwed home on the spindle 28 the cushion 27 will bias or force the tool shank toward the open end of the socket 17 and into driving relation with the chuck.

The operation of the device is as follows:

When a cutting tool is to be inserted into the chuck the chuck is rotated a few turns downward on its spindle, then the tool shank is pushed upward at the lower end of the chuck socket and rotated until it freely enters the socket. This will bring the tool shank against the cushion 27 with the groove 21 in position to receive the lug 20. The tool 20 is then turned counterclockwise to carry the stop shoulder 22 against the lug 20. This brings the lands 17.1 of the tool into registry with the lands 17.2 of the chuck. Then the chuck is turned counterclockwise on the spindle compressing the cushion 27 and applying sufficient force to wedge the tool shank against any possible vibration within the chuck. To remove the tool from the chuck, the chuck is turned clockwise on the spindle to release the pressure on the cushion 27, whereupon upward pressure on the tool and clockwise rotation thereof with respect to the socket, will bring the surface 23 of the tool into contact with the surface 24 of the stop lug, assuring alignment of the lands 17.1 and 17.2 into registry with the flutes 18 and 19 respectively, permitting the tool to be withdrawn downwardly from the chuck.

Although but one specific embodiment of this invention is herein shown and described, it will be understood that numerous details of the construction shown may be altered or omitted without departing from the spirit of the invention as defined by the following claims.

I claim:

1. A combination of a rotary cutter and a chuck having coacting complementary cutter shank and chuck socket surfaces conically tapered convergently toward the outer end of the chuck socket, said surfaces being fluted to form alternating longitudinal landing areas and depressed areas arranged for mutual registry of the landing areas of the shank and socket in one relative angular position thereof and for registry of the depressed areas of one with the landing areas of the other in another relative angular position thereof, said depressed areas being formed to provide in said last named angular position clearance for withdrawing the shank from the socket, and means in said socket for biasing said shank in the axially outward direction.

2. A combination of a rotary cutter having a shank and a chuck having a socket, said shank and socket having coacting complementary surfaces conically tapered convergently toward the outer end of the socket, said surfaces being fluted to provide alternating longitudinal landing areas and depressed areas arranged for mutual registry of the landing areas of the shank and socket in one relative angular position thereof and for registry of the depressed areas of one surface with the landing areas of the other surface in another relative angular position thereof, said depressed areas being formed to provide in said last named angular position clearance for withdrawing the shank from the socket, shoulders on said chuck and shank positioned to engage each other for positive driving of the shank in said first named relative angular position, and means in said socket for biasing said shank in the axially outward direction.

3. The combination of a rotary cutter having a shank and a chuck having a socket for said shank, said shank and socket having coacting complementary surfaces conically tapered convergently toward the outer end of the socket, said surfaces being fluted to provide alternating longitudinal landing areas and depressed areas arranged for mutual registry of the landing areas of the shank and socket in one relative angular position thereof and for registry of the depressed areas of one surface with the landing areas of the other surface in another relative angular position thereof, said depressed areas being formed to provide in said last named angular position clearance for withdrawing the shank from the socket, shoulders on said chuck and shank positioned to engage each other for positive driving of the shank in said first named relative angular position, shoulders on said chuck and shank positioned to engage each other in said other relative angular positions, and means for normally biasing said shank in the axially outward direction of said socket.

4. The combination of a rotary cutter shank and chuck, each having a plurality of high surface areas coacting with complementary high surface areas on the other, said high surface areas being arranged in longitudinal strips and conforming geometrically to the surface of a truncated cone concentric with the axis of the shank and converging toward the outer end of said chuck, each said shank and chuck having depressed surface areas separating said high surface areas and adapted to permit said shank to be withdrawn from the outer end of said chuck when rotated relatively to a position where said high areas register with said low areas, and means in said chuck for biasing said shank toward the outer end of the chuck when the high surfaces of the shank and chuck are coacting with each other.

5. The combination of a rotary cutter shank and a chuck having a socket for said shank, said shank and socket having coacting complementary surfaces conically tapered convergently toward the outer end of the socket, said surfaces being fluted to provide alternating longitudinal landing areas and depressed areas arranged for mutual registry of the landing areas of the shank and socket in one relative angular position thereof and for registry of the depressed areas of one surface with the landing areas of the other surface in another relative angular position thereof, said depressed areas being formed to provide in said last named angular position clearance for withdrawing the shank from the socket, a shoulder on said chuck extending inwardly of said conical surface, a shoulder on said shank adapted to have driving engagement with said chuck shoulder when said landing areas of said shank are in registry with the landing areas of said chuck, and means for resiliently biasing said shank toward the outer end of said chuck when said chuck and shank are in the first mentioned angular position.

6. The combination of a rotary cutter shank and a chuck having a socket for said shank, said shank and socket having coacting complementary surfaces conically tapered convergently toward the outer end of the socket, said surfaces being fluted for forming alternating longitudinal landing areas and depressed areas arranged for mutual registry of the landing areas of the shank and socket in one relative angular position thereof and for registry of the depressed areas of one surface with the landing areas of the other surface in another relative angular position thereof, said depressed areas being formed to provide in said last named angular position clearance for withdrawing the shank from the socket, shoulders on said chuck and shank positioned to engage each other for positive driving of the shank in said first named relative angular position, and a driving spindle threaded into said chuck from the end thereof opposite said socket and adapted to urge said shank axially for frictional engagement of the landing areas thereof with the landing areas of said chuck when said landing areas are in registry with each other.

7. The combination specified in claim 6, in which a resilient cushion is interposed between the spindle and bit shank.

8. The combination specified in claim 3, in which the angular widths of the landing and depressed areas differ so that there is only one angular position of the bit shank in which it can be inserted or withdrawn from the chuck.

References Cited in the file of this patent

UNITED STATES PATENTS

| 1,043,098 | Gross | Nov. 5, 1912 |
| 1,063,215 | Ream | June 3, 1913 |
| 1,431,072 | Williams | Oct. 3, 1922 |
| 2,092,060 | Gairing | Sept. 7, 1937 |
| 2,122,244 | Brown | June 28, 1938 |
| 2,219,907 | Ross | Oct. 29, 1940 |
| 2,280,299 | Onsrud | Apr. 21, 1942 |
| 2,634,985 | Groen | Apr. 14, 1953 |